United States Patent
Berger

[19]

[11] Patent Number: 5,911,436
[45] Date of Patent: Jun. 15, 1999

[54] GAS BAG FOR A VEHICULAR OCCUPANT RESTRAINT SYSTEM

[75] Inventor: Jürgen Berger, Mutlangen, Germany

[73] Assignee: TRW Occupant Restraint Systems GmbH, Alfdorf, Germany

[21] Appl. No.: 08/889,026

[22] Filed: Jul. 7, 1997

[30] Foreign Application Priority Data

Jul. 18, 1996 [DE] Germany ............ 296 12 502 U

[51] Int. Cl.⁶ ............................................. B60R 21/30
[52] U.S. Cl. ........................................ 280/739; 280/743.1
[58] Field of Search ............................ 280/739, 728.1, 280/743.1, 738

[56] References Cited

U.S. PATENT DOCUMENTS 3,887,213  6/1975  Goetz ................................ 280/739
5,007,662  4/1991  Abramczyk et al. ............... 280/739
5,219,179  6/1993  Eyrainer et al. .................... 280/739
5,704,639  1/1998  Cunill et al. ....................... 280/739

FOREIGN PATENT DOCUMENTS 423981    4/1991  European Pat. Off. .
495410    7/1992  European Pat. Off. .
25 42 764 4/1977  Germany .......................... 280/739
4306615   9/1994  Germany .

*Primary Examiner*—Christopher P. Ellis
*Attorney, Agent, or Firm*—Tarolli, Sundheim, Covell, Tummino & Szabo

[57] ABSTRACT

A gas bag for a vehicular occupant restraint system comprises a wall defining an interior space of the gas bag intended to be filled with pressurized gas. A plurality of curved nicks is provided in the wall of the gas bag. Each of the curved nicks determines an emission orifice for the pressurized gas.

5 Claims, 2 Drawing Sheets

GAS BAG FOR A VEHICULAR OCCUPANT RESTRAINT SYSTEM

The invention relates to a gas bag for a vehicular occupant restraint system.

BACKGROUND OF THE INVENTION

Gas bags for vehicular occupant restraint systems are known which are provided with emission orifices from which, in the deployed state of the gas bag, emission of part of the gas used for deploying the gas bag is possible.

By controlled emission of the gas from the deployed gas bag an optimum restraint function is achieved by the deployed gas bag, adapted in each case to the severity of collision and the weight of the vehicle occupant. The emission of the gas from the gas bag may be achieved for example by an emission orifice formed in the wall of the gas bag, obtained by cutting out a portion of fabric. In the case of such a single emission orifice the hem of the emission orifice is generally reinforced by an applied ring of fabric.

BRIEF DESCRIPTION OF THE INVENTION

The present invention provides a gas bag for a vehicular occupant restraint system, which comprises a wall defining an interior space of the gas bag intended to be filled with pressurized gas. A plurality of curved nicks is provided in the wall of the gas bag. Each of the curved nicks determines an emission orifice for the pressurized gas. Instead of only a single emission orifice in accordance with prior art, which is formed by cutting out a fabric part from the wall of the gas bag, it is provided for in accordance with the invention that on the one hand a plurality of emission orifices is formed and that, on the other, a fabric part is no longer cut out, i.e. instead, only nicks are formed which determine the corresponding emission orifice. If a plurality of emission orifices is employed, each individual emission orifice may be very much smaller than the sole emission orifice as used in prior art. This results all-in-all in less weakening of the wall by the emission orifices, so that a reinforcement around the emission orifices is no longer needed. As a result of this, in addition to material savings, a reduced volume of the gas bag in the folded condition materializes. Moreover, no waste results in the production of the gas bag in accordance with the invention, since no material is cut out. Additionally, final inspection of the gas bags is made less complicated. When only one single emission orifice is provided it needs to be assured under all circumstances in final inspection that this emission orifice has been configured as prescribed. When, by contrast, a plurality of emission orifices is used, it is acceptable that under circumstances a minor portion of these emission orifices has not been configured as prescribed, since the remaining, correctly configured emission orifices still ensure the desired behaviour of the gas bag in a collision.

In accordance with a preferred embodiment of the invention it is provided for that the nicks have the form of a circular arc, thus resulting in an approximate circular emission orifice, as a result of which the strength of the fabric surrounding the corresponding emission orifice is hardly detrimented.

BRIEF DESCRIPTION OF THE DRAWINGS

The invention will now be described with respect to the attached drawing in which.

BRIEF DESCRIPTION OF THE DRAWINGS

Figure 1:
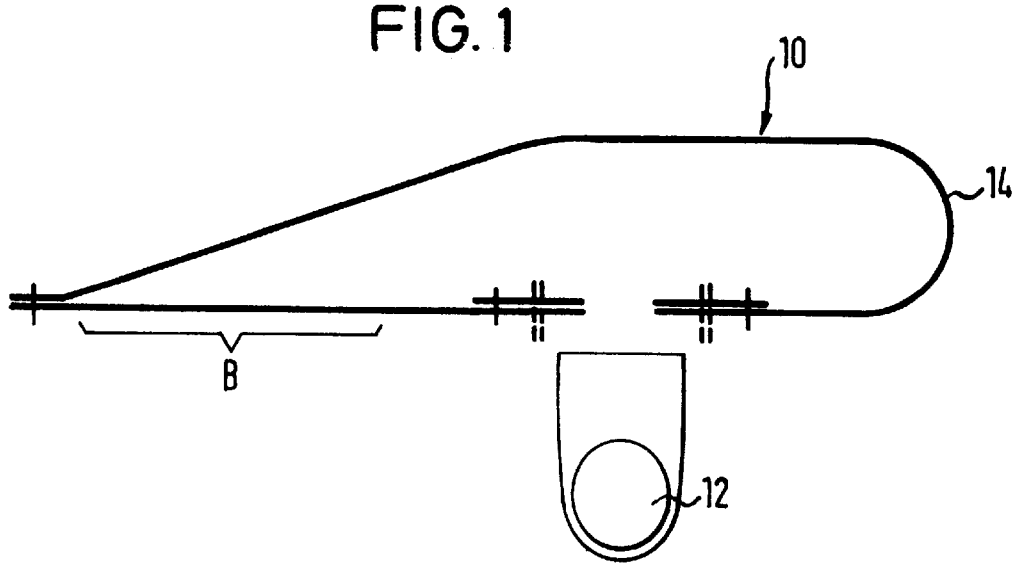
FIG. 1 is a schematic cross-section through a gas bag in accordance with the invention.
Figure 2:
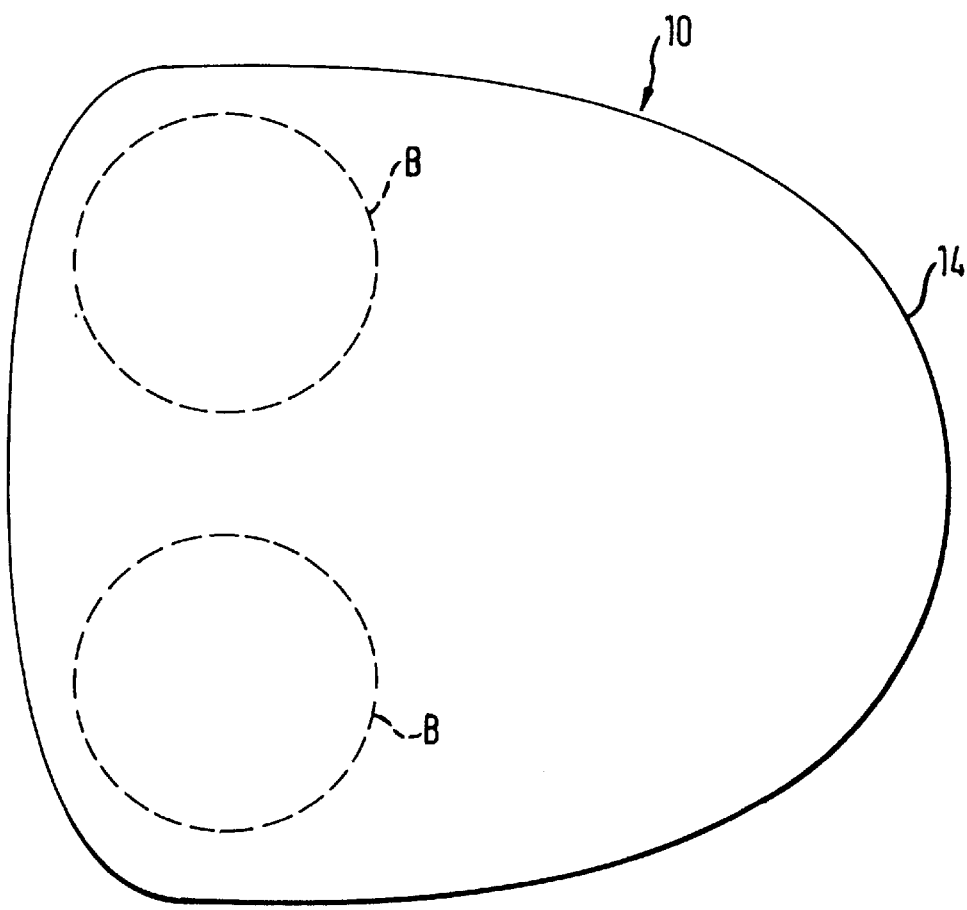
FIG. 2 is a schematic plan view of the gas bag shown in FIG. 1.
Figure 3:
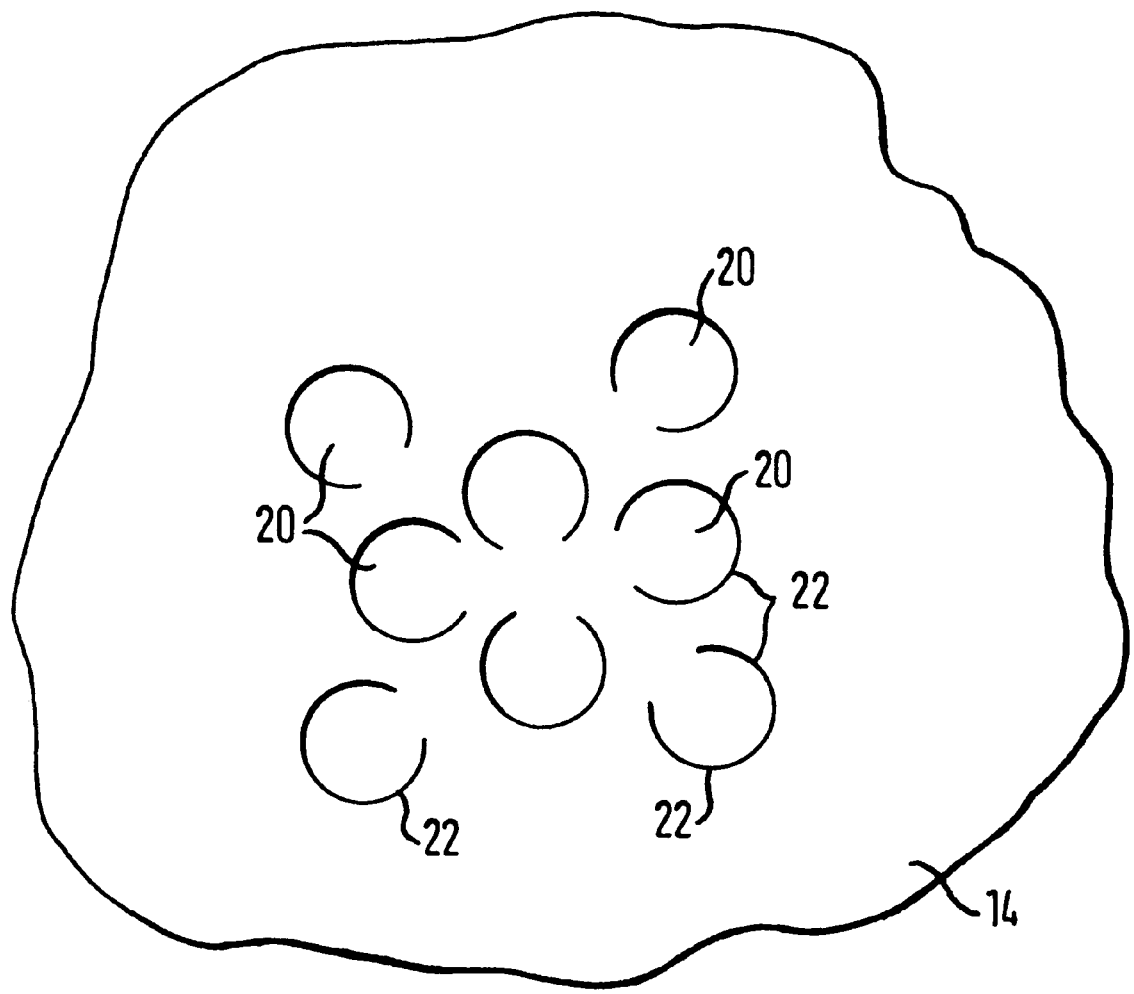
FIG. 3 is a schematic and magnified plan view of part of the gas bag shown in FIG. 1.

In FIGS. 1 and 2 a gas bag 10 in accordance with the invention is illustrated schematically which may be pressurized by means of a gas generator 12 and thus deployed. In the wall 14 of the gas bag 10 a plurality of emission orifices 20 is formed which are illustrated magnified in FIG. 3. The emission orifices are arranged in the regions B so that in the deployed condition of the gas bag 10 they face away from the vehicle occupant to be protected by the gas bag, i.e. facing, for instance, the windshield or the dashboard of the vehicle. These regions B correspond to sections of the wall of the gas bag 10 which are stressed relatively slightly on deployment of the gas bag.

Each of the emission orifices is determined by a curved nick 22 which in the preferred embodiment illustrated has the form of a circular arc which, measured from the center point of the corresponding emission orifice, covers an angular range of more than 180°. In this way a near circular piece of fabric is formed for each emission orifice which, when the interior of the gas bag defined by the wall 14 is filled with pressurized gas, is opened up towards the outer space of the gas bag, so that part of the pressurized gas is able to be emitted.

The emission orifices have preferably a cross-section between approximately 20 mm$^2$ and 200 mm$^2$. The cross-section as a whole formed by all emission orifices amounts to approximately 3000 mm$^2$, this value being subject to modifications depending on the individual requirements and conditions of employment.

In accordance with an alternative embodiment (not shown) the nicks determining the emission openings may also be configured so that they have the form of an elliptical arc or a similar geometry. The longer half-axis of the elliptical arc may then be oriented with respect to the direction of the warp and weft threads of the fabric forming the wall of the gas bag so as to obtain minimum lessening of the strength of the wall.

I claim:

1. A gas bag for a vehicular occupant restraint system, comprising a wall defining an interior space of said gas bag intended to be filled with pressurized gas, a plurality of curved nicks being provided in said wall, each of said curved nicks being pre-cut entirely through the gas bag wall thereby determining an emission orifice for said pressurized gas.

2. The gas bag of claim 1, wherein said nicks have the form of a circular arc.

3. The gas bag of claim 2, wherein said nicks, as measured from the center point of a corresponding one of said emission orifices, cover an angular range of more than 180°.

4. The gas bag of claim 1, wherein the cross-section of each of said emission orifices amounts to between approximately 20 mm$^2$ and approximately 200 mm$^2$.

5. The gas bag of claim 1, wherein said emission orifices have a total cross-section of approximately 3000 mm$^2$.

* * * * *